July 8, 1930.  R. FREEMAN  1,770,030
BRAKE EQUALIZER
Filed Dec. 13, 1927  2 Sheets-Sheet 2
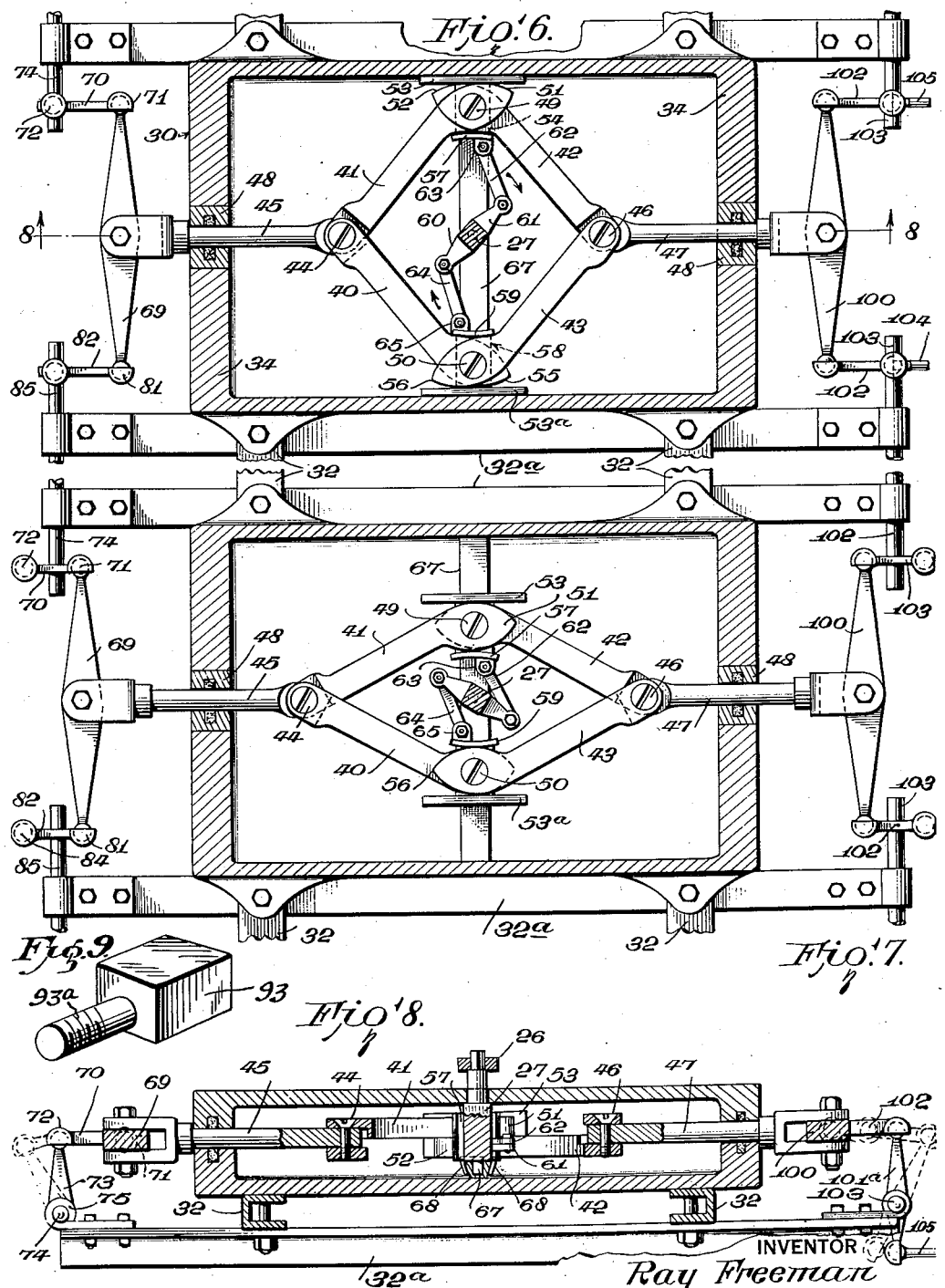

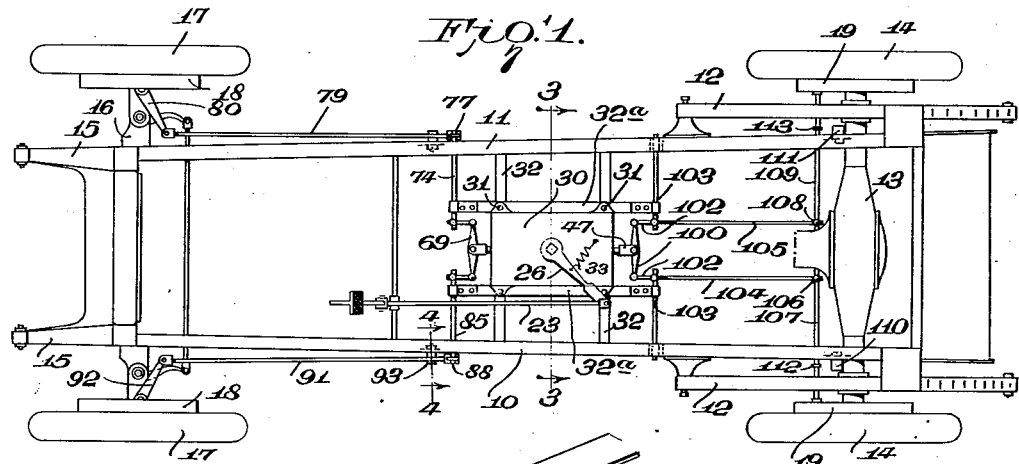

Patented July 8, 1930

1,770,030

UNITED STATES PATENT OFFICE

RAY FREEMAN, OF PERRINE, FLORIDA

BRAKE EQUALIZER

Application filed December 13, 1927. Serial No. 239,779.

This invention relates to equalizers for four wheel brakes.

An object of the invention is the provision of a device which is simple in construction and adapted for ready application to any type of automobile for applying the brakes of the vehicle while at the same time providing for an equalization of the pressure to all brakes.

A further object of the invention is the provision of a device for use in connection with four wheel brakes of a vehicle in which the pressure is applied with equal force while at the same time compensating for the breakage of any of the connections between the brakes in order to apply the remaining brakes which are still connected with the operating device with the proper force to control the stopping of the vehicle.

This invention will be best understood from a consideration of the following detailed description in connection with the accompanying drawings; nevertheless, it is to be understood that the invention is not confined to the disclosure being susceptible of such changes and modifications as shall define no material departure from the salient features of the invention as expressed in the appended claims.

In the drawings:—

Figure 1 is a plan view of the chassis showing my equalizer applied thereto,

Figure 2 is a view in perspective of my equalizer showing the connections with the brake pedal, Figure 3 is a transverse vertical section taken along the line 3—3 of Fig. 1, Figure 4 is a transverse vertical section taken along the line 4—4 of Fig. 1, Figure 5 is a view in perspective of a sliding carriage of the equalizer, Figure 6 is a horizontal section taken along the line 6—6 of Fig. 3, showing the equalizer in an inoperative position, Figure 7 is a similar section showing the equalizer in an operative position.

Figure 8 is a longitudinal vertical section taken along the line 8—8 of Fig. 6.

Figure 9 is a view in perspective of a stop and its eccentric support.

Referring more particularly to the drawings 10 and 11 designate a pair of channel beams of the chassis frame of a vehicle, the frame being supported by springs 12 mounted on the rear axle housing 13 carried by rear wheels 14. The forward end of the frame is supported by means of springs 15, the front axle 16, and front wheels 17. The front wheels are provided with brakes 18 while the rear wheels have brakes 19.

A rock shaft 20 is mounted in bearings 21 carried by the channel frames 10 and 11. A brake pedal 22 is rigidly connected to the shaft 20 and one end of a rod 23 is pivotally connected to the pedal intermediate the ends thereof. The rear end of the rod has pivotal connections at 24 with the free end of a lever 26. This lever is rigid with a vertically disposed shaft 27 mounted in bearings on the top 28 and bottom 29 of a housing 30 which is secured at 31 to transverse bars 32 supported by the U-beams 10 and 11. A spring 33 is connected at one end to the lever 26 and at its other end to the top of the housing 30 for maintaining said lever in a predetermined position when the brake pedal 22 has been released by the foot of the operator.

The cover 28 is removable from the housing 30 so that the parts within said housing may be readily inspected or repaired and if desired, the housing may be packed with grease for the efficient lubrication of the moving elements. The end walls 34 of the housing are cut away as shown at 35 and the cover has a triangularly-shaped depending projection 36 which is received within the cut out portion 35 for a purpose which will be presently explained.

Located within the housing 30 is an equalized means interpolated in the braking mechanism in order to provide for the equitable distribution of the force of the brake lever 22 when applied in order that all four wheels may be required to do their full share of work in bringing the car to a full stop and thus prevent excessive wear on any of the tires of the wheels. The device consists of four bars 40, 41, 42 and 43. A pair of the adjacent ends of the bars 40 and 41 are pivotally connected at 44 to a reciprocating rod or plunger 45. A pair of adjacent ends of the rods 42 and 43 are pivotally connected at 46 to a reciprocating rod or plunger 47. The rods 45 and 47 are respectively moved through bearings 48 formed in the opposite ends 34 of the housing 30. Since the inner ends of the triangularly-shaped projection 36 form parts of the bearings for the rods, said rods may be removed together with the bars 40 to 43, inclusive, when the cover has been lifted off the housing. The adjacent ends of the bars 41 and 42 are pivotally connected together at 49 while the adjacent ends of the bars 40 and 43 are pivotally connected together at 50. An end of the bar 41 is provided with a cam member 51 and the bar 42 has an integrally formed cam member 52. These cam members are adapted to be engaged by a substantially straight plate 53 forming part of a carriage 54. Bars 40 and 43 are respectively provided with cam members 55 and 56 which are adapted to be engaged by a substantially straight plate 53ª of the carriage 58 which is similar to the carriage 54.

The carriage 54 has an inwardly disposed upstanding curved plate 57 adapted to engage the inner faces of the cam members 51 and 52 while the carriage 58 has a curved upstanding plate 59 adapted to engage the inner faces of the cam members 55 and 56.

Rigid with the shaft 27 is a pair of levers 60 and 61. A link 62 is pivoted at one end to the free end of the lever 61. The other end of said link is pivotally connected to a pair of ears 63 secured to or formed integrally with the upstanding flange 57. A link 64 has one end pivotally connected to the free end of the lever 60 and the other end pivotally connected to a pair of ears 65 formed integrally with or secured to the curved plate 59.

Each carriage has a base member 66 which is adapted to ride upon a track 67 and has depending inturned flanges 68 adapted to engage the undercut faces of the track 67 whereby the carriage is not only guided on the track but is maintained in position. Any other suitable form of track and guides may be employed for the purpose.

The outer end of the rod or piston 45 is pivotally connected to the intermediate portion of a lever 69. A rod 70 has a universal connection at 71 with one end of the lever and a universal connection at 72 with the upper free end of a lever 73 rigid with a rock shaft 74 mounted in bearings 75 and 76. A lever 77 is rigid with the outer end of the shaft 74 and has its lower end 78 pivotally connected to a rod 79 which extends forwardly of the vehicle and is connected to an arm 80 for actuating the right brake band 18.

The other end of the lever 69, as shown at 81, has a universal connection with a link 82 and a lever 83 has a universal connection 84 with said link. The lever 83 is rigid with a rock shaft 85 mounted in bearings 86 and 87. To the outer free end of said shaft is rigidly connected a lever 88. The lower arm 89 of the lever 88 is pivotally connected at 90 to a rod 91 which extends forwardly and is connected to an arm 92 which actuates the brake band 18 on the front left wheel of the vehicle.

Stops 93 and 94 are secured to and project respectively from the outer faces of the channel beams 10 and 11 by means of bolts 93ª and nuts 94ª. Lug 93 is adapted to be engaged by the free arm 95 of the lever 88 while the free arm 96 of the lever 77 is adapted to engage the lug or stop 94 for a purpose which will be presently explained. From an inspection of Fig. 4, it will be seen that a bolt 93ª is located eccentrically with respect to a stop 93 or 94 so that when a nut 94ª is loosened, a stop may be rotated to bring a portion of said stop closer to the end of a lever associated therewith to compensate for wear in the connection between a brake and the equalizer. By properly rotating the stop the greater portion of the stop is placed closer to the end of a lever 95 or 96 in one case, and closer to the end of a lever 112 or 113 in the other case. The stop 93 is formed integrally with the bolt 93ª and since this stop has its faces located eccentrically with respect to the axis of the bolt 93ª the rotation of said bolt will cause different faces of the stop 93 to come adjacent the arm 95 while certain of the faces will be disposed at a less distance from the free end of the arm 25 than certain of the other faces.

A lever 100 is pivotally connected intermediate the ends thereof to the outer free end of the rod or piston 47. Each lever 101 and 101ª is rigid with a shaft 103 supported in a bearing at an end of a bar 32ª and in a bearing on a U-beam 10 or 11. Links 102 have universal connections with the upper end of the levers 101 and 101ª and also with the free ends of the lever 100.

A rod 104 connects the lower end of lever 101 with a lever 106 rigid with a rock shaft 107. A rod 105 connects the lower end of lever 101ª with a lever 108 rigid with a rock shaft 109 which is adapted to actuate the right brake band 19 of the wheel 14. Shaft 107 when rocked is adapted to actuate the left brake band 19.

Lugs 110 and 111 are respectively secured to the outer side walls of the channel beams 10 and 11. The lug 110 is adapted to be engaged by a lever 112 secured to the shaft 107 while the lever 113 is adapted to engage the lug 111 for a purpose which will be presently described.

The operation of my invention is as follows:

During the operation of the vehicle and when the foot brake 22 is applied the rod 23 is moved in a direction indicated by the arrows in Fig. 2, the lever 26 is rocked thereby revolving shaft 27 and causing the links 62 and 64 to be moved in the direction indicated by the arrows in Fig. 6, whereby the carriages 54 and 58 will be moved towards each other thus drawing the pivotally connected ends of the arms 41, 42 and 40, 43 towards the center of the shaft 27 while the opposite ends of said arms which are respectively pivoted to the rods or pistons 45 and 47 are moved outwardly thereby forcing said pistons outwardly from the housing 30 and causing the levers 69 and 100 to be moved away from the opposite ends of said housing. When this action occurs the links 70 and 82 are moved towards the forward end of the vehicle rocking shafts 73 and 83 respectively, and thereby rocking the levers 77 and 88, so that the lower ends of the levers will be moved rearwardly in the direction indicated by the arrows in Fig. 2, causing a pull on the respective rods 79 and 91 and likewise applying the brakes at the forward part of the vehicle.

When the rod 47 is moved outwardly from the housing 30 simultaneously with the similar movement of the rod or piston 45, the lever 100 is moved away from the rear end of the housing 30 causing a pull on the rods 104 and 105, thereby actuating the levers 106 and 108 and rocking the respective shafts 107 and 109, which in turn cause application of the brakes 19 to the brake drums of the rear wheels 14. This mechanism provides for an equal distribution of the forces to all four brake bands simultaneously so that all four wheels will cooperate in bringing the vehicle to a stop.

If at any time any of the connections between the brake bands and the respective levers 77, 88, 112 or 113 should break, the upper ends of the levers 77 and 88 or the levers 112 and 113 will be moved into engagement with their respective stops or lugs 93, 94 or 110, 111 and thus take up the strain on that part of the connections for maintaining a proper application of the force on the remaining brake bands through their connections.

The equalizing mechanism shown in the housing 30 is so constructed that it will also take up any wear on the parts due to the fact that it is only necessary to move a pair of the opposite ends of the parallelogram formed by the bars 40 to 43 inclusive, inwardly and transversely of the vehicle a slight distance for projecting the rods 45 and 47 outwardly of the housing for the application of the brakes. The parallelogram has the effect of lazy tongs for converting a lateral movement into a longitudinal movement.

It will be appreciated that during the operation of the carriages 54 and 58 towards each other or towards the center of the housing or towards the shaft 27, the free ends of the bars 41, 42 and 40, 43 where they are provided with cam like members are engaged by the upstanding flanges 53 and 53$^a$, thereby forcing these connected ends of the bars inwardly towards the shaft 27 so that the greater portion of the strain of operating the parallelogram is borne by said flanges. The inner flanges 57 and 59 are curved sufficiently to permit the cam like portion of the bars to readily ride over the same during the movements of these connected ends of the bars which are located along a line disposed longitudinally and centrally of the housing 30.

It will be noted that the entire equalizing device which includes the parallelogram formed of the pivotally connected bars 40 to 43, inclusive, is capable of sliding in the housing 30 and in which the pivoted ends, as shown at 49 and 50 are slidable between the respective spaced ears 53, 57 and 59, 53$^a$. This sliding construction provides a compensating means for variations in the brakes and their connections and this is true particularly when some of the parts become worn or a new brake lining has replaced an old one, so that one of the pistons is not required to move through as great a stroke as it had before the replacement. Thus, if brake linings on the rear wheels have been replaced by new ones, the distance that the piston 47 is required to travel will be only a portion of its former stroke before the brakes at the rear end are set and the joints 49 and 50 will slide freely through the carriages 54 and 58 and until the pressure is equal on the levers 69 and 100. As the brakes are released the curved flanges 59 and 57 will force the pivoted joints 49 and 50 out and will act as an automatic centering device, as shown more particularly in Fig. 6.

I claim:—

1. An equalizing device for brakes of a vehicle comprising a plurality of bars, a pair each of the bars located in spaced parallel relation and having the adjacent ends thereof pivotally connected together and forming a parallelogram, a rod pivoted to each pair of the connected ends of the bars at a pair of the opposite corners of the parallelogram, the other end of each rod having connections with a pair of brakes at one end of the vehicle, and means connected to the other ends of the bars at the other opposite corners of the parallelogram for causing said ends to be moved towards or away from each other to cause reciprocation of the rods.

2. An equalizing device for brakes of a vehicle comprising a plurality of bars, a pair each of the bars located in spaced parallel relation and having the adjacent ends thereof pivotally connected together and forming a parallelogram, a rod pivoted to each pair of the connected ends of the bars at a pair of the oppositely disposed corners of the parallelogram, the other end of each rod being connected with a pair of brakes at one end of the vehicle, means associated with a pair of the connected ends of the bars at the other opposite corners of the parallelogram for causing said ends to be moved towards and away from each other to cause reciprocation of the rods, guides for the connected ends of the bars at the last mentioned opposite corners of the parallelogram.

3. An equalizing device for brakes of a vehicle comprising a plurality of bars, a pair each of the bars located in spaced parallel relation and having the adjacent ends thereof pivotally connected together and forming a parallelogram, a rod pivoted to each pair of the connected ends of the bars at a pair of the oppositely disposed corners of the parallelogram, the other end of each rod having connections with a pair of brakes at one end of the vehicle, carriages slidably receiving the other connected ends of the bars at the other opposed pair of corners of the parallelogram, and means for moving the carriages towards or away from each other for moving the pairs of connected ends towards or away from each other for reciprocating the rods.

4. An equalizing device for brakes of a vehicle comprising a plurality of bars a pair each of the bars being located in spaced parallel relation and having the adjacent ends thereof pivotally connected together and forming a parallelogram, a rod pivoted to each pair of the connected ends of the bars at a pair of the oppositely disposed corners of the parallelogram, the other end of each rod having connections with a pair of brakes at one end of the vehicle, carriages slidably receiving the other connected ends of the bars at the other opposed corners of the parallelogram, a shaft, a brake pedal, operative connections between the brake pedal and the shaft, levers rocked by the shaft, and links connecting the carriages with the levers.

5. An equalizing device for brakes of a vehicle comprising a plurality of bars, a pair each of the bars located in spaced parallel relation and having the adjacent ends thereof pivotally connected together and forming a parallelogram, a rod pivoted to each pair of the connected ends of the bars at a pair of the oppositely disposed corners of the parallelogram, the other end of each rod having connections with a pair of brakes at one end of the vehicle, the other connected ends of the bars at the other opposed corners of the parallelogram having rounded cam like portions, carriages for slidably receiving said rounded cam-like portions of the bars, and means or moving the carriages towards or away from each other for causing the rods to be moved away or towards each other.

6. An equalizing device for brakes of a vehicle comprising pairs of brakes, a plurality of bars, a pair each of the bars located in spaced parallel relation and having the adjacent ends thereof pivotally connected together and forming a parallelogram, the inner ends of the bars where connected together at a pair of the opposed corners of the parallelogram having rounded cam-like portions, carriages mounted for sliding movement and provided with upstanding flanges to receive the cam-like portions of the bars, and means for moving the carriages towards or away from each other for producing a similar movement in the last mentioned connected ends of the bars whereby the outer connected ends of the bars are moved in a direction which is opposite to the direction of movement of the inner connected ends of the bars, and means connected with the outer ends of the bars and having connections with the brakes of the vehicle for applying said brakes.

7. An equalizing device for brakes of a vehicle comprising pairs of brakes, a plurality of bars, a pair each of the bars located in spaced parallel relation and having the adjacent ends thereof pivotally connected together and forming a parallelogram, the inner ends of the bars where connected together at a pair of the opposed corners of the parallelogram having rounded cam-like portions, carriages mounted for sliding movement and provided with upstanding flanges to receive the cam-like portions of the bars, means for moving the carriages towards or away from each other for producing a similar movement in the last mentioned connected ends of the bars whereby the outer connected ends of the bars are moved in a direction which is opposite to the direction of movement of the inner connected ends of the bars, said carriages having downwardly inturned flanges, and tracks provided with oppositely disposed undercut side edges to receive the depending flanges, and means connected with the outer connected ends of the bars and having connections with the brakes of the vehicle for applying said brakes.

8. An equalizing device for brakes of a vehicle comprising pairs of brakes, a plurality of bars, a pair each of the bars located in spaced parallel relation and having the adjacent ends thereof pivotally connected together and forming a parallelogram, the inner ends of the bars where connected together at a pair of the opposed corners of the parallelogram having rounded cam-like portions, carriages mounted for sliding movement and provided with upstanding flanges for engagement with the cam like portions of the bars for causing the pairs of inner connected ends of the bars to be moved towards or away from each other, means for moving the carriages towards or away from each other for producing a similar movement of the inner ends of the bars whereby the outer ends of the bars are moved in a direction which is opposite to the direction of movement of the inner connected ends of the bars, a rod pivotally connected at one end to each opposite pair of the outer ends of the bars, and means connecting a rod with a pair of the brakes at an end of the vehicle.

9. An equalizing device for brakes of a vehicle comprising pairs of brakes, a plurality of bars, a pair each of the bars located in spaced parallel relation and having the adjacent ends pivotally connected together and forming a parallelogram, the inner ends of the bars where connected together at a pair of the opposed corners of the parallelogram having rounded-cam-like portions, carriages mounted for sliding movement and provided with upstanding flanges to receive and engage the cam-like portions of the bars, means for moving the carriages towards or away from each other for causing the flanges to act on the cam-like portions of the bars so that the pairs of the inner ends of the bars are moved towards or away from each other and the outer ends of the bars are moved in a direction which is opposite to the direction of movement of the inner connected end of the bars, a rod pivotally connected at one end to an outer pair of the ends of the bars, a lever pivoted intermediate the ends thereof to the other end of a rod, and means connecting the ends of each lever with a pair of brakes at an end of the vehicle.

10. An equalizing device for brakes of a vehicle comprising a plurality of bars, a pair of each of the bars being located in spaced parallel relation and having the adjacent ends pivotally connected together and forming a parallelogram, the inner connected ends of the bar having rounded cam-like portions, carriages mounted for sliding movement and provided with upstanding flanges for acting on the cam-like portions and for causing movement of the inner connected ends of the bars towards or away from each other, a brake pedal, means rotated by the brake pedal for moving the carriages towards or away from each other and for producing a similar movement in the inner connected ends of the bars whereby the outer connected ends of the bars are moved in a direction which is opposite to the direction of movement of the inner connected ends of the bars, a rod connected at one end to each pair of the outer connected ends of the bars, a lever pivoted intermediate the ends thereof to the other end of a rod, brakes for controlling the wheels of the vehicle, and means connecting the ends of the lever with a pair of brakes at one end of the vehicle.

11. An equalizing device for brakes of a vehicle comprising a plurality of brakes, a plurality of bars, a pair of each of the bars being located in spaced parallel relation and having the adjacent ends pivotally connected together and forming a parallelogram, the inner connected ends of the bar having rounded cam-like portions, carriages mounted for sliding movement and provided with flanges, said flanges acting in the cam-like portions of the bars when the carriages are moved for moving the pairs of inner ends of the bars towards or away from each other, a shaft, means operatively connecting the shaft with the brake pedal, levers secured to the shaft, a link connecting an arm with a carriage so that when the shaft is rotated by the pedal, the links will move the carriages toward or away from each other and likewise the inner connected ends of the bars, the outer connected ends of said bars being likewise moved but in opposite directions to the inner ends, and means connecting the outer ends of the bars with the brakes.

12. An equalizing device for brakes of vehicles comprising a plurality of brakes at each end of the vehicle, an equalizing means having connection with the brakes at the opposite ends of the vehicle, means for actuating the equalizing means for causing application of the brakes, means incorporated in the connection for insuring proper application of the brakes when certain of the connections become broken, and means for adjusting the last mentioned means for compensating for wear in the connections.

Signed at Elizabethton in the county of Carter and State of Tennessee, this 10th day of December A. D. nineteen hundred twenty-seven.

RAY FREEMAN.